United States Patent
Kim et al.

(10) Patent No.: US 7,709,141 B2
(45) Date of Patent: *May 4, 2010

(54) LITHIUM ION SECONDARY BATTERY

(75) Inventors: Yongtae Kim, Yongin-si (KR);
Seok-Gyun Chang, Yongin-si (KR);
Yooeup Hyung, Yongin-si (KR);
Kyonghwan Song, Yongin-si (KR);
Jungseog Kim, Yongin-si (KR);
Sangbong Nam, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 408 days.

This patent is subject to a terminal disclaimer.

(21) Appl. No.: 11/646,889

(22) Filed: Dec. 27, 2006

(65) Prior Publication Data

US 2007/0154804 A1 Jul. 5, 2007

(30) Foreign Application Priority Data

Dec. 29, 2005 (KR) ...................... 10-2005-0134537
Dec. 29, 2005 (KR) ...................... 10-2005-0134539
Dec. 29, 2005 (KR) ...................... 10-2005-0134540

(51) Int. Cl.
*H01M 2/02* (2006.01)
(52) U.S. Cl. ...................... 429/174; 429/175; 429/176; 429/185; 429/163
(58) Field of Classification Search ................. 429/174, 429/175, 176, 185, 163
See application file for complete search history.

(56) References Cited

U.S. PATENT DOCUMENTS

2005/0100782 A1  5/2005  Iijima et al.
2006/0099502 A1  5/2006  Kim et al.
2006/0121339 A1  6/2006  Woo et al.

FOREIGN PATENT DOCUMENTS

CN            1485939 A       3/2004

(Continued)

OTHER PUBLICATIONS

Patent Abstracts of Japan, Publication No. 09-274920; Publication Date: Oct. 21, 1997; in the name of Nakajima et al.

(Continued)

*Primary Examiner*—Laura S Weiner
(74) *Attorney, Agent, or Firm*—Christie, Parker & Hale, LLP

(57) ABSTRACT

Electrode assemblies easily impregnated with an electrolyte are provided. A sealing tape attached to the outer circumference of the electrode assembly comprises a material having an affinity for the electrolyte. Alternatively, the entire sealing tape or a portion of the tape is coated with the material. In another alternative, the surface of the sealing tape is rough, thereby improving wetting of the tape by the electrolyte and diffusion of the electrolyte into the tape. In another embodiment, first and second insulating plates comprise a material having an affinity for the electrolyte. In another alternative, the insulating plates comprise a mixture of a material having an affinity for the electrolyte and polypropylene or polyethylene. Alternatively, the surfaces of the insulating plates are coated with the material or with a surfactant that reduces the surface tension of the electrolyte.

7 Claims, 14 Drawing Sheets

FOREIGN PATENT DOCUMENTS

| | | | |
|---|---|---|---|
| JP | 06-150971 | * | 5/1994 |
| JP | 9-274920 | | 10/1997 |
| JP | 10-163075 | | 6/1998 |
| JP | 10-284046 | | 10/1998 |
| JP | 10-308204 | | 11/1998 |
| JP | 2001-210384 | | 8/2001 |
| JP | 2001-297790 | | 10/2001 |
| JP | 2002-198099 | * | 7/2002 |
| KR | 2000-0075765 | | 12/2000 |
| KR | 10-2004-0090642 | | 10/2004 |
| WO | WO 98/38688 | | 9/1998 |

OTHER PUBLICATIONS

Patent Abstracts of Japan, Publication No. 10-163075; Date of Publication: Jun. 19, 1998; in the name of Hisashi Tsukamoto, et al.
Patent Abstracts of Japan, Publication No. 2001-297790; Date of Publication: Oct. 26, 2001; in the name of Makino Hatazaki, et al.
Korean Patent Abstracts, Publication No. 1020040090642 A; Date of Publication: Oct. 26, 2004; in the name of Seung U. Choi.
Office action, with English translation, dated Sep. 19, 2008, for corresponding Chinese Patent Application No. 2006101563502 listing the cited reference.
U.S. Office action dated Aug. 3, 2009, for divisional U.S. Appl. No. 12/348,835, noting listed references in this IDS.

* cited by examiner

LITHIUM ION SECONDARY BATTERY

CROSS-REFERENCE TO RELATED APPLICATIONS

This application claims priority to and the benefit of Korean Patent Application Nos. 10-2005-0134537, 10-2005-134539, and 10-2005-134540, all filed on Dec. 29, 2005 in the Korean Intellectual Property Office, the entire contents of which are incorporated herein by reference.

BACKGROUND

1. Field of the Invention

The present invention relates to lithium ion secondary batteries. More particularly, the present invention relates to lithium ion secondary batteries having a sealing tape attached to the outer circumference of the electrode assembly.

2. Discussion of Related Art

Recently, compact and light electrical and electronic apparatuses, such as mobile telephones, notebook computers, and camcorders, have been actively developed and produced. Battery packs are built in the portable electrical and electronic apparatuses so that the portable electrical and electronic apparatuses can operate without an additional power source. The built-in battery pack includes at least one battery for outputting a uniform voltage level to drive the portable electrical or electronic apparatus for a desired period of time.

Secondary batteries that can be charged and discharged have recently been used as the battery packs for economic reasons. Secondary batteries include Ni—Cd batteries, Ni—MH batteries, lithium metal batteries, and lithium ion batteries.

The operation voltage of lithium ion secondary batteries is commonly 3.6V, which is three times higher than the operation voltages of Ni—Cd batteries and Ni—MH batteries which are widely used as the power sources for portable electronic apparatuses. In addition, the energy density per unit weigh of lithium ion secondary batteries is high. Therefore, use of lithium ion secondary batteries has rapidly increased.

In lithium ion secondary batteries, lithium based oxides are used as the positive electrode active materials, and carbon materials are used as the negative electrode active materials. In general, lithium ion secondary batteries are classified into liquid electrolyte batteries and polymer electrolyte batteries depending on the kind of electrolyte. Batteries using liquid electrolytes are referred to as lithium ion batteries and batteries using polymer electrolytes are referred to as lithium polymer batteries. Also, lithium ion secondary batteries can take various shapes, such as cylinders, polygons, and pouches.

In general, a cylindrical lithium ion secondary battery includes an electrode assembly having a positive electrode plate coated with positive active materials, a negative electrode plate coated with negative active materials, and a separator positioned between the positive electrode plate and the negative electrode plate. The separator prevents the positive electrode plate and the negative electrode plate from short-circuiting and permits movement of only lithium ions. The electrode assembly is wound and placed in a case together with the electrolyte, and a cap assembly seals the case.

A sealing tape for supporting, protecting, and insulating the electrode assembly is wound around the outer circumference of the electrode assembly in the lithium ion secondary battery. The sealing tape is commonly formed of polyolefin based materials such as polyethylene (PE), polypropylene (PP), and polyimide (PI). However, these materials are barely wetted by the electrolyte and the electrolyte is barely diffused into the materials (the materials have a weak affinity for the electrolyte). As a result, the capillary phenomenon, which generates a minute gap between the case and the electrode assembly during impregnation of the electrolyte, is prevented. Furthermore, as the capacity of the battery increases, the density of the electrode assembly increases. Therefore, the external diameter of the electrode assembly increases and the space between the electrode assembly and the case decreases, making impregnation of the electrolyte more difficult.

In a cylindrical lithium ion secondary battery, before inserting the electrode assembly into the case, a lower insulating plate is inserted to insulate the electrode assembly and the case from each other. Also, after inserting the electrode assembly and before sealing the case with the cap assembly, an upper insulating plate is inserted to insulate the electrode assembly and the cap assembly from each other.

Since the upper and lower insulating plates are commonly formed of polyethylene (PE) or polypropylene (PP), the upper and lower insulating plates are barely wetted by the electrolyte and the electrolyte is barely diffused into the upper and lower insulating plates (the upper and lower insulating plates have weak affinities for the electrolyte). Therefore, the electrode assembly is prevented from being sufficiently impregnated with the electrolyte. Furthermore, as the capacity of the battery increases, the density of the electrode assembly increases. As a result, the external diameter of the electrode assembly increases. When the external diameter of the electrode assembly increases, the space between the case and the electrode assembly decreases, making impregnation of the electrolyte more difficult.

SUMMARY OF THE INVENTION

In one embodiment of the present invention, a lithium ion secondary battery includes a sealing tape formed of a material having an affinity for the electrolyte to improve impregnation of the electrolyte.

In another embodiment, a lithium ion secondary battery includes a sealing tape having a surface coated with a material having an affinity for the electrolyte to improve impregnation of the electrolyte.

In yet another embodiment of the present invention, a lithium ion secondary battery includes first and second insulating plates, and the surface of at least one of the first and second insulating plates is modified by a material that can be easily impregnated with an electrolyte. This enables even a high density electrode assembly to be easily impregnated with the electrolyte.

In still another embodiment of the present invention, a lithium ion secondary battery includes first and second insulating plates and the surface of at least one of the first and second insulating plates is coated with a material that can be easily impregnated with an electrolyte. This enables even a high density electrode assembly to be easily impregnated with the electrolyte.

According to one embodiment of the present invention, a lithium ion secondary battery includes an electrode assembly, a sealing tape attached to the outer circumference of the electrode assembly, a case for accommodating the electrode assembly together with an electrolyte, and a cap assembly for sealing an opening on the top of the case. In one embodiment, the sealing tape is formed of a material having an affinity for the electrolyte so that the electrolyte is easily diffused into the sealing tape and so that the sealing tape is easily wetted by the electrolyte.

In one embodiment, the material having an affinity for the electrolyte is a polymer material having a contact angle at the interface with the electrolyte ranging from about 1 to about 80°, as measured during contact angle experimentation. One nonlimiting example of a suitable polymer material is polyvinylidene fluoride (PVdF). The PVdF may be PVdF 761, PVdF 2801, or a mixture of PVdF 761 and PVdF 2801.

In another embodiment, the polymer material includes an ester group or a carboxyl group.

In another embodiment, a plurality of holes are formed in the sealing tape. The holes can take any shape. For example, the holes may circular, triangular, or quadrangular.

According to another embodiment of the present invention, a lithium ion secondary battery includes an electrode assembly, a sealing tape attached to the outer circumference of the electrode assembly, a case for accommodating the electrode assembly and an electrolyte, and a cap assembly for sealing an opening in the case. The surface of the sealing tape is coated with a material having an affinity for the electrolyte so that the electrolyte is easily diffused into the sealing tape and so that the sealing tape is easily wetted by the electrolyte.

In one embodiment, the sealing tape is formed of polyethylene (PE) or polypropylene (PP).

In another embodiment, the material having an affinity for the electrolyte can be PVdF having a contact angle at the interface with the electrolyte ranging from about 1 to about 80°, as measured during contact angle experimentation. For example, the PVdF can be PVdF 761, PVdF 2801, or a mixture of PVdF 761 and PVdF 2801.

In one embodiment, the material having an affinity for the electrolyte can include an ester group or a carboxyl group.

According to another embodiment, the material having an affinity for the electrolyte can be a surfactant. The surfactant can be BRIJ®.

In one embodiment, a plurality of holes are formed in the sealing tape. The holes may take any shape, for example circles, triangles, quadrangles.

According to still another embodiment of the present invention, a lithium ion secondary battery includes an electrode assembly, a sealing tape attached to the outer circumference of the electrode assembly, a case for accommodating the electrode assembly and an electrolyte, and a cap assembly for sealing an opening in the case. The surface of the sealing tape is rough so that the electrolyte is easily diffused into the sealing tape and so that the sealing tape is easily wetted by the electrolyte.

The sealing tape can be formed of polyethylene (PE) or polypropylene (PP). The sealing tape can be wetted by the electrolyte and the electrolyte diffused into the sealing tape at a contact angle at the interface with the electrolyte of about 1 to about 80° as measured through contact angle experimentation.

A plurality of holes can be formed in the sealing tape. The holes can take any shape, such as circles, triangles, and quadrangles.

According to still another embodiment of the present invention, a lithium ion secondary battery includes an electrode assembly, a case for accommodating the electrode assembly and an electrolyte, a cap assembly for sealing the case, a first insulating plate positioned between the electrode assembly and the case, and a second insulating plate positioned between the electrode assembly and the cap assembly. At least one of the first and second insulating plates comprises a material having an affinity for the electrolyte so that the electrolyte is easily diffused into the sealing tape and so that the sealing tape is easily wetted by the electrolyte. The material having an affinity for the electrolyte can be a polymer material having a contact angle at the interface with the electrolyte ranging from about 1 to about 80°, as measured during contact angle experimentation. In one embodiment, the polymer material may be PVdF. For example, the PVdF may be PVdF 761, PVdF 2801, or a mixture of PVdF 761 and PVdF 2801.

In another embodiment, the polymer material can include an ester group or a carboxyl group.

According to still another embodiment of the present invention, a lithium ion secondary battery includes an electrode assembly, a case for accommodating the electrode assembly and an electrolyte, a cap assembly for sealing the case, a first insulating plate positioned between the electrode assembly and the case, and a second insulating plate positioned between the electrode assembly and the cap assembly. At least one of the first and second insulating plates comprises a material including a mixture of a material having an affinity for the electrolyte and a material that does not have an affinity for the electrolyte. The material having an affinity for the electrolyte can be an oxide having a contact angle at the interface with the electrolyte ranging from about 1 to about 80° as measured during contact angle experimentation. In one embodiment, the oxide can be silica ($SiO_2$) or aluminum oxide ($Al_2O_3$).

In one embodiment, the oxide is present in an amount ranging from about 30% to about 95% by weight based on the total weight of the mixture. The material that does not have an affinity for the electrolyte can be polyethylene (PE) or polypropylene (PP).

According to still another embodiment of the present invention, a lithium ion secondary battery includes an electrode assembly, a case for accommodating the electrode assembly and an electrolyte, a cap assembly for sealing the case, a first insulating plate positioned between the electrode assembly and the case, and a second insulating plate positioned between the electrode assembly and the cap assembly. At least one of the first and second insulating plates has at least one surface coated with a material having an affinity for the electrolyte so that the electrolyte is easily diffused into the sealing tape and so that the sealing tape is easily wetted by the electrolyte. The material having an affinity for the electrolyte can be a polymer material having a contact angle at the interface with the electrolyte ranging from about 1 to about 80° as measured during contact angle experimentation. In one embodiment, the polymer material is PVdF. For example, the PVdF may be PVdF 761, PVdF 2801, or a mixture of PVdF 761 and PVdF 2801.

In another embodiment, the polymer material includes an ester group or a carboxyl group.

In still another embodiment, the material having an affinity for the electrolyte is a surfactant. One exemplary surfactant is BRIJ®.

In one embodiment, the first and second insulating plates are formed of polyethylene (PE) or polypropylene (PP). According to one embodiment, the second insulating plate is cylindrical. A plurality of holes can be formed on a surface of the second insulating plate.

BRIEF DESCRIPTION OF THE DRAWINGS

These and other features and advantages of the present invention will become more apparent by reference to the following detailed description when considered in conjunction with the accompanying drawings in which.

DETAILED DESCRIPTION

Figure 1:
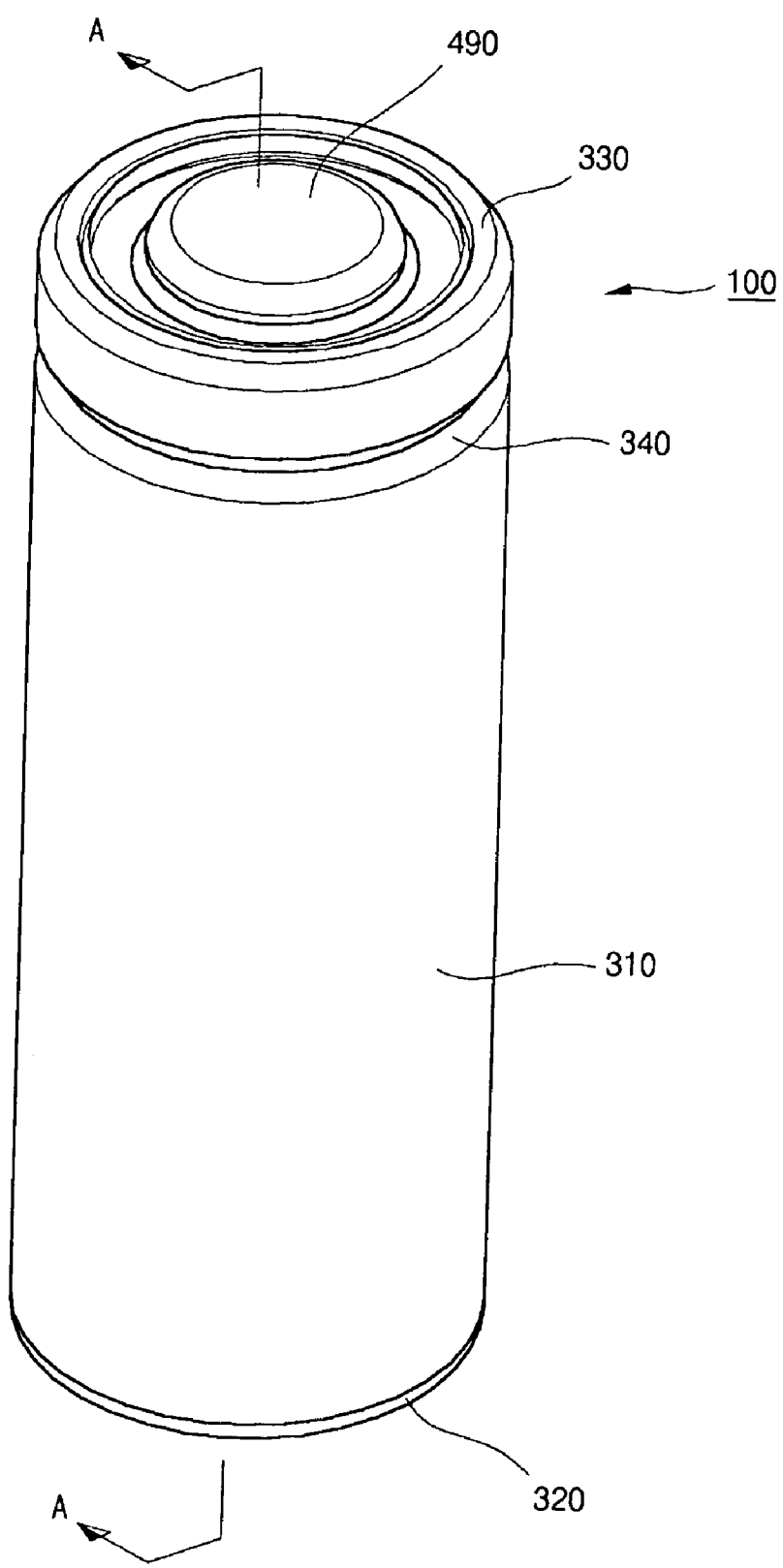
FIG. 1 is a perspective view of a lithium ion secondary battery according to one embodiment of the present invention.
Figure 2:
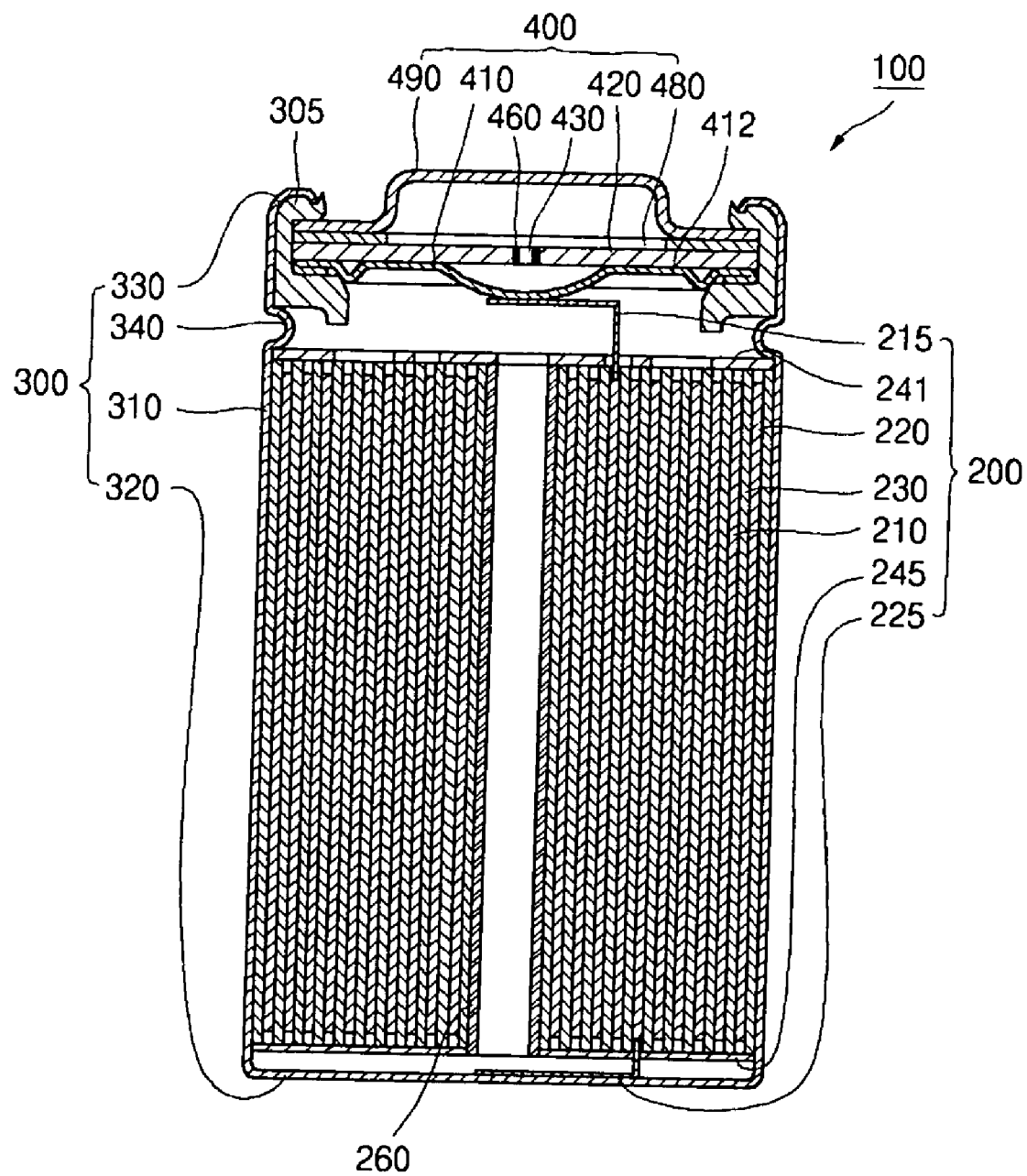
FIG. 2 is a cross-sectional view of the battery of FIG. 1 taken along line A-A.

FIG. 1 is a perspective view of a lithium ion secondary battery according to one embodiment of the present invention. FIG. 2 is a cross-sectional view of the battery of FIG. 1 taken along line A-A. For convenience, a cylindrical lithium ion secondary battery is described. However, the present invention is not limited to cylindrical lithium ion secondary batteries and can include any lithium ion secondary batteries, including polygonal lithium ion secondary batteries.

Referring to FIGS. 1 and 2, a cylindrical lithium ion secondary battery 100 includes an electrode assembly 200, a cylindrical case 300 for accommodating the electrode assembly 200 and an electrolyte, and a cap assembly 400 coupled to the cylindrical case 300 for sealing the cylindrical case 300 and for passing current generated by the electrode assembly 200 to an external apparatus.

Referring to FIG. 2, the electrode assembly 200 includes a positive electrode plate 210 obtained by coating the surface of a positive electrode collector with a positive electrode coating, a negative electrode plate 220 obtained by coating the surface of a negative electrode collector with a negative electrode coating, and a separator 230 positioned between the positive electrode plate 210 and the negative electrode plate 220. The separator 220 electrically insulates the positive electrode plate and the negative electrode plate 220 from each other. The electrode assembly 200 is wound to form a jelly-roll shape.

The positive electrode plate 210 can include a positive electrode collector formed of a thin metal plate having good conductivity. For example, aluminum (Al) foil can be used as the positive electrode plate. The positive electrode coating can be coated on both surfaces of the positive electrode collector. Both ends of the positive electrode collector may include portions that are not coated with the positive electrode coating. A positive electrode tab 215 formed of aluminum (Al) may protrude outside the electrode assembly 200 and can be connected to one uncoated end of the positive electrode collector.

Also, the negative electrode plate 220 can include a negative electrode collector formed of a thin conductive metal plate, for example, copper (Cu) or nickel (Ni) foil. The negative electrode coating can be coated on both surfaces of the negative electrode collector. Both ends of the negative electrode collector can include portions that are not coated with the negative electrode coating. A negative electrode tab 225 formed of nickel (Ni) protrudes outside the electrode assembly 200 and can be connected to an uncoated end of the negative electrode collector.

The lithium ion secondary battery 100 may further include first and second insulating plates 241 and 245, respectively, connected to the electrode assembly 200. The insulating plates 241 and 245 prevent the electrode assembly 200 from being connected directly to the cap assembly 400 and cylindrical case 300 The insulating plates 241 and 245 are described further below.

Figure 3:
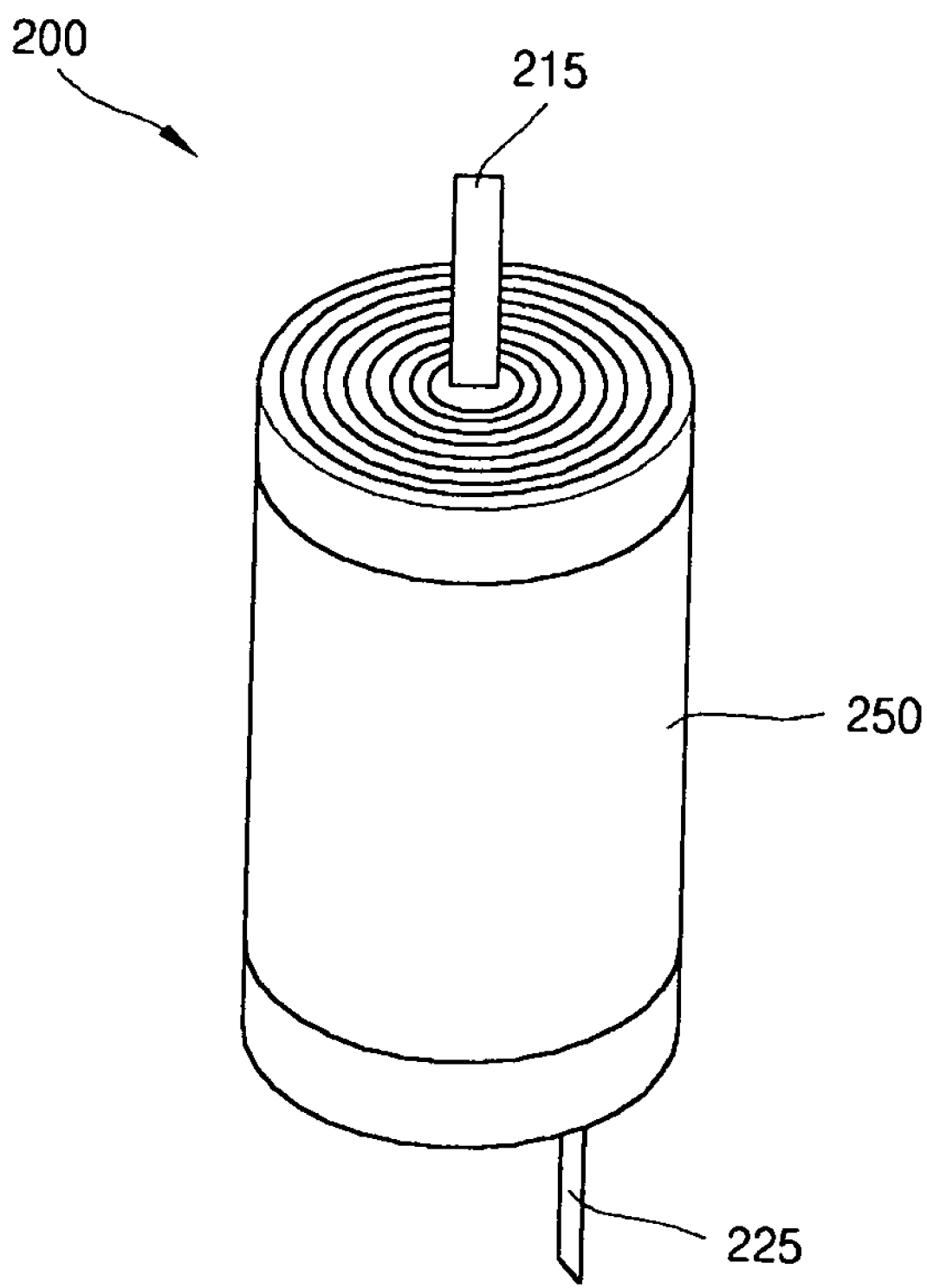
FIG. 3 is a perspective view of an electrode assembly including a sealing tape according to one embodiment of the present invention.

Referring to FIG. 3, on the outer circumference of the electrode assembly 200, a sealing tape 250 can be attached to support and protect the electrode assembly 250. The positive electrode plate and the negative electrode plate face each other and are separated from each other by the separator positioned between the positive and negative electrode plates. The positive and negative electrode plates and the separator are cylindrically wound and a section of the wound separator is exposed to the outermost circumference of the electrode assembly 200. To prevent the wound electrode assembly 200 from unwinding, the sealing tape 250 can be attached to the outer circumference of the electrode assembly 200 as well as to the end of the separator.

In one embodiment, the internal surface of the case 300 that accommodates the electrode assembly 200 is formed of a material having an affinity for the electrolyte, such as aluminum (Al), steel (Fe), or an equivalent material. However, the sealing tape 250 is commonly formed of a material that does not have an affinity for the electrolyte, such as polyethylene (PE), polypropylene (PP), and polyimide (PI). Furthermore, when the electrode assembly 200 is inserted into the case 300, the internal surface of the sealing tape 250 and the internal surface of the case 300 are close to each other so that there is little to no space in which the electrolyte can be impregnated. The sealing tape 250 does not have an affinity for the electrolyte, thereby preventing the electrolyte from penetrating via the capillary phenomenon.

Since polyethylene (PE) has low density and a loose arrangement of molecules, polyethylene (PE) is easily processed. Also, since polyethylene (PE) is formed of only $CH_2$, its electrical insulation properties are excellent. Since polyethylene (PE) has a symmetrical carbon (C) chain, as illustrated by its chemical formula, polyethylene (PE) is suitable for use as a high frequency insulating material.

Polypropylene (PP) has an isotactic structure and a methyl group is arranged in the same direction. Its crystallinity is high before molding, but is reduced after molding.

However, neither polyethylene (PE) nor polypropylene (PP) has an affinity for non-aqueous electrolytes. This is because large differences in surface energy exist between the non-aqueous electrolyte and polyethylene (PE) or polypropylene (PP), such that the molecules of the electrolyte are not easily combined with the surface of the sealing tape formed of polyethylene (PE) or polypropylene (PP). Therefore, when the sealing tape formed of polyethylene (PE) or polypropylene (PP) contacts the electrolyte, the electrolyte beads up so that the sealing tape is barely wetted by the electrolyte and so that the electrolyte is barely diffused into the sealing tape.

According to one embodiment of the present invention, the sealing tape 250 is modified by a material having an affinity for the electrolyte, which material is easily wetted by the electrolyte so that the electrolyte is easily diffused into the material. According to this embodiment, the material of the sealing tape 250 is wetted by the electrolyte and the electrolyte is diffused into the sealing tape 250 at a contact angle at the electrolyte interface ranging from about 1 to about 80° as measured during contact angle experimentation. Here, when drops of the electrolyte contact the surface of the sealing tape 250, the electrolyte drops are diffused into the surface. For example, when the electrolyte drops are not diffused the contact angle is large, meaning that the sealing tape 250 does not have an affinity or has a low affinity for the electrolyte. When the electrolyte drops are widely diffused, the sealing tape 250 does have an affinity or a greater affinity for the electrolyte. In other words, when the electrolyte forms drops on the material, the material is hydrophobic. When the electrolyte is widely diffused, however, the material is hydrophilic.

According to one embodiment, a material having an affinity for the electrolyte is polyvinylidene fluoride (PVdF) among other polymer materials. PVdF has a repeating structure of —$CH_2$—$CF_2$— and is a kind of fluoro-resin used as a binder for coating electrode active materials on a collector. The main chain of the fluoro-resin has the same C—C bond as polyolefin. The fluoro-resin is a synthetic resin having a structure in which part or all of the hydrogen atoms of the polyolefin are replaced by fluorine atoms (F).

Experimentation regarding electrolyte impregnation revealed that PVdF that is easily wetted by the non-aqueous electrolyte and into which the non-aqueous electrolyte is easily diffused includes PVdF 761 and PVdF 2801. Therefore, according to one embodiment, the sealing tape comprises a material selected from PVdF 761, PVdF 2801, and mixtures thereof.

As described above, in order to make a sealing tape that is easily wetted by the non-aqueous electrolyte and that the non-aqueous electrolyte easily diffuses into, the sealing tape can be modified by PVdF. Alternatively, the sealing tape can be formed of a polymer material including an ester group or a carboxyl group (I.e., a hydrophilic atom group) instead of the PVdF.

The ester group is an atom group that forms an aliphatic compound represented by RCOOR'. To generate the ester, an alcohol or phenol reacts with an organic or inorganic acid to remove water ($H_2O$), thereby generating the ester. In particular, inorganic acid esters such as sulfuric acid ester and nitric ester may be used as an organic solvent. The carboxyl group is an atom group that forms an aliphatic compound represented by RCOOH, such as acetic acid ($CH_3COOH$) and benzoic acid ($C_6H_5COOH$).

Polymer materials including an ester group or carboxyl group have an affinity for the non-aqueous electrolyte. When the sealing tape is formed of sulfuric acid ester or benzoic acid (including an ester group or carboxyl group), the sealing tape is easily wetted by the electrolyte and the electrolyte is easily diffused into the sealing tape. As a result, electrolyte impregnation is improved.

Figure 4A:
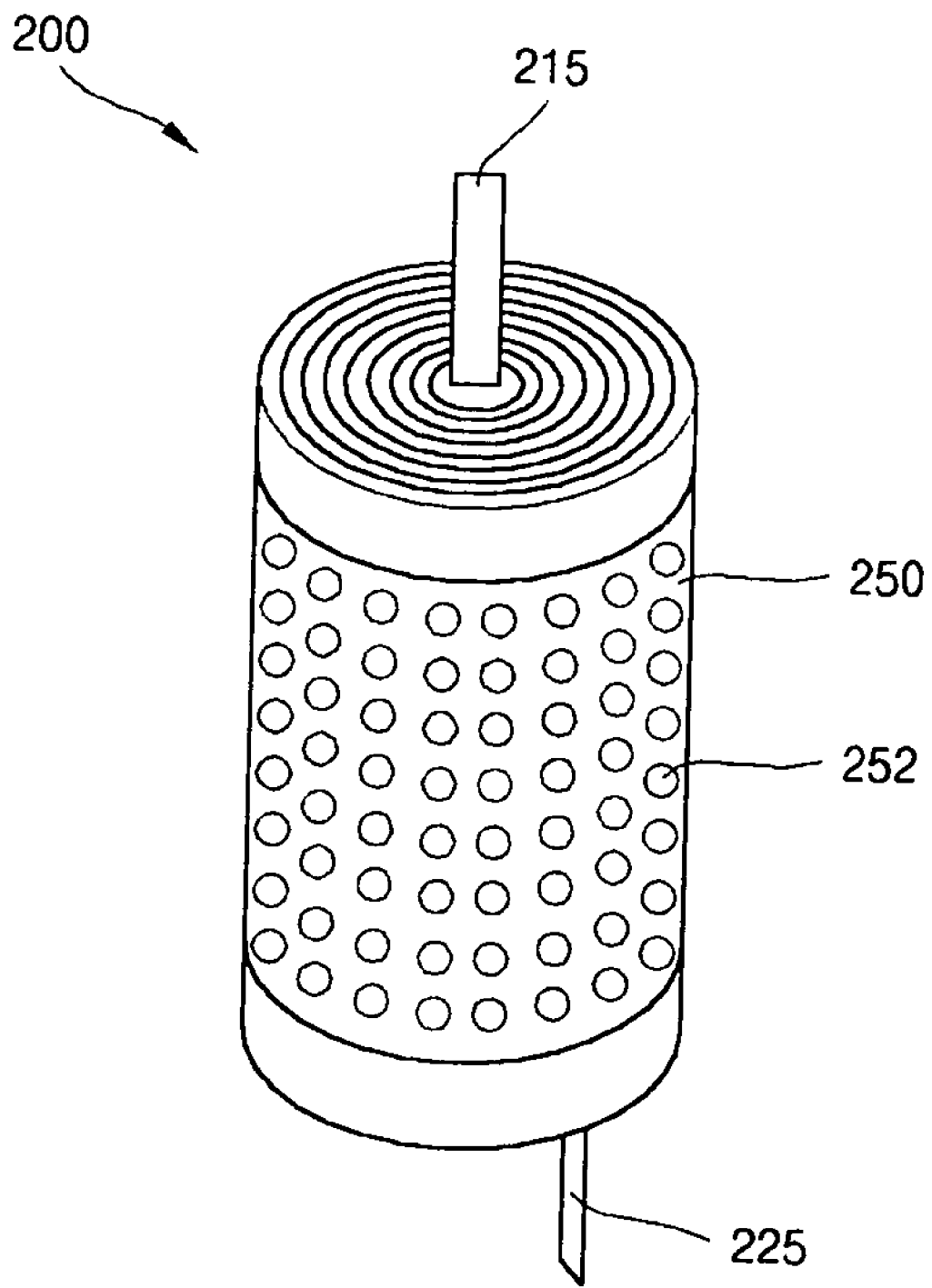
FIG. 4a is a perspective view of an electrode assembly including a sealing tape according to another embodiment of the present invention.
Figure 4B:
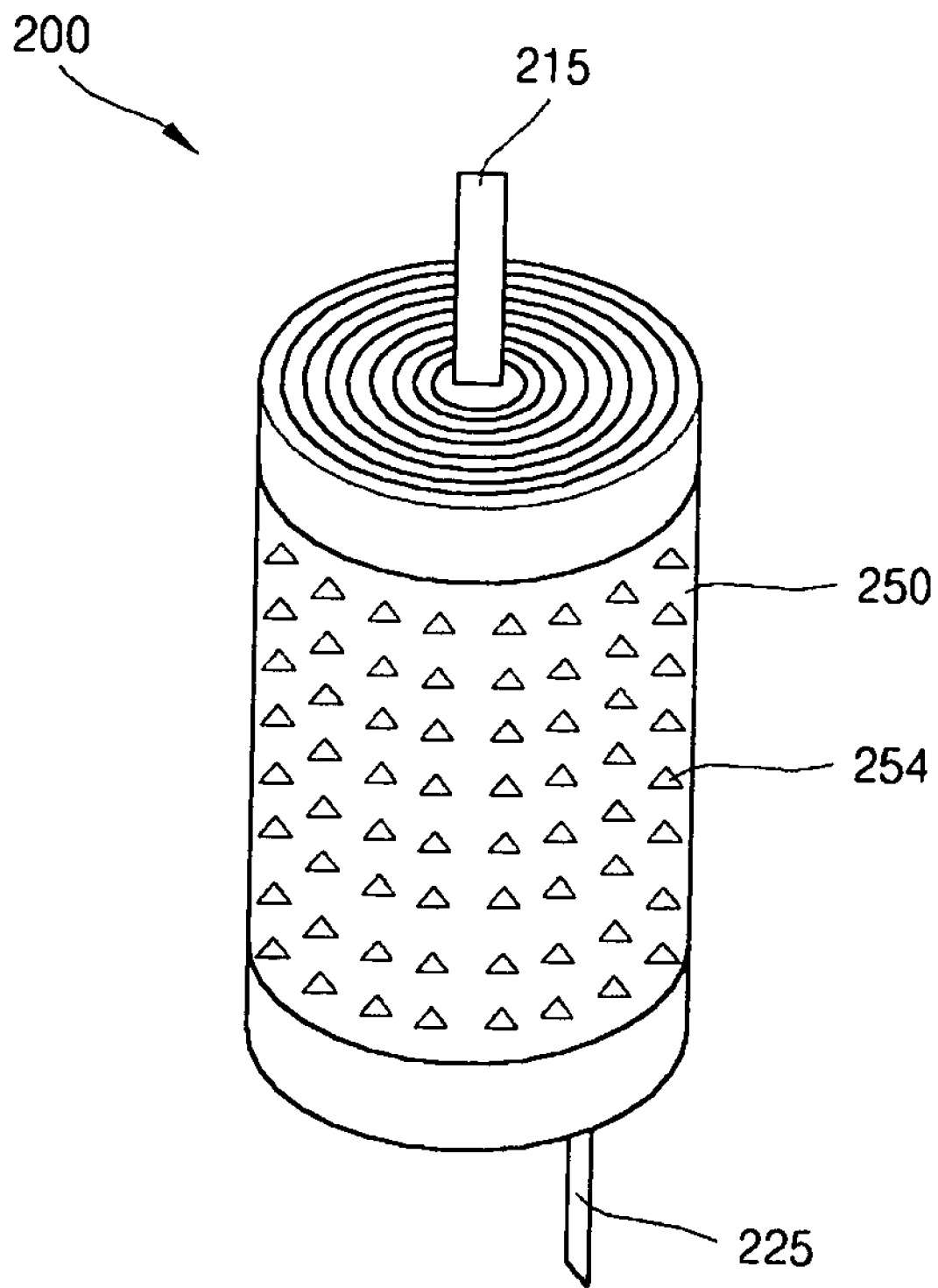
FIG. 4b is a perspective view of an electrode assembly including a sealing tape according to yet another embodiment of the present invention.
Figure 4C:
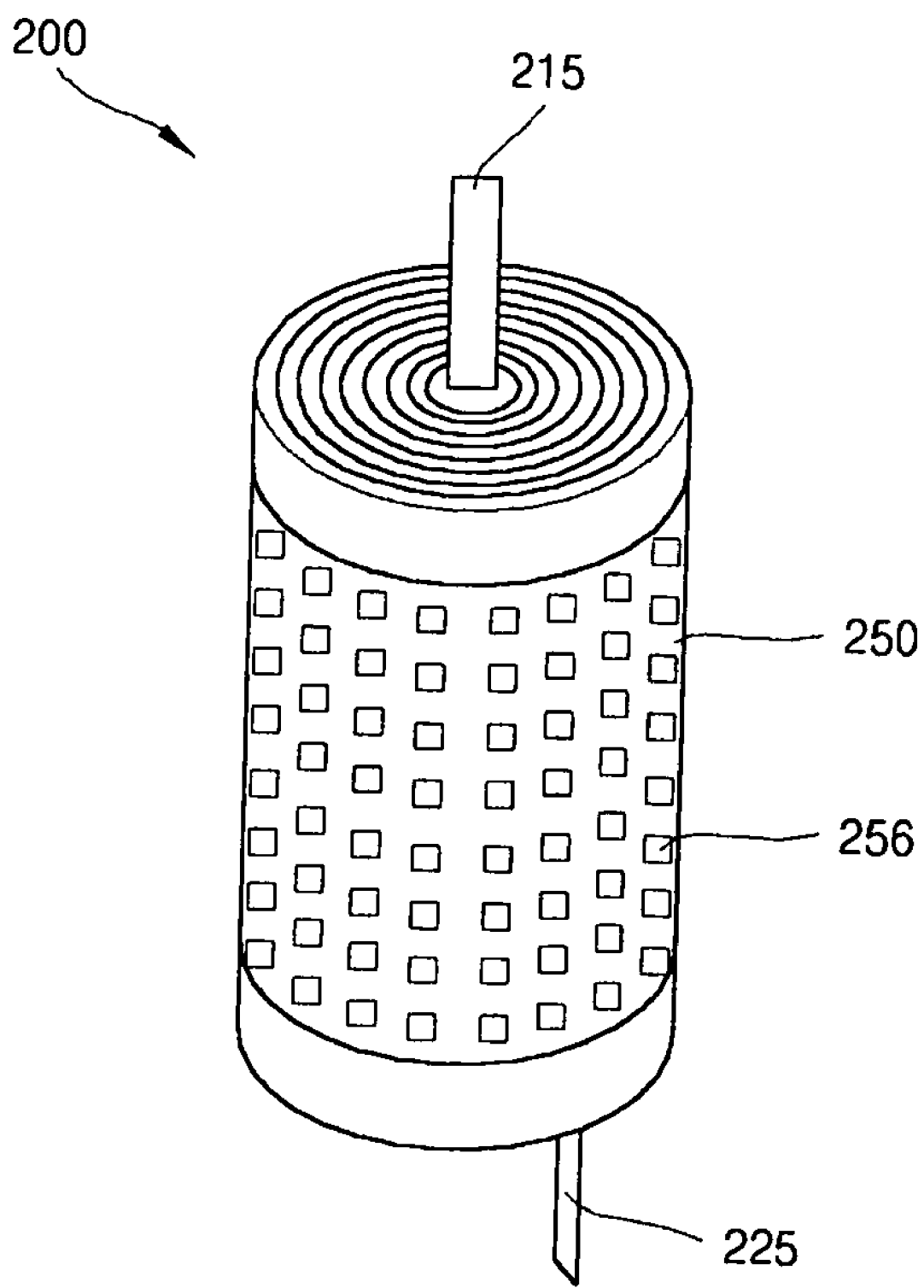
FIG. 4c is a perspective view of an electrode assembly including a sealing tape according to still another embodiment of the present invention.

FIGS. 4a to 4c are perspective views of electrode assemblies including sealing tapes according to various alternative embodiments of the present invention. The holes 252, 254, and 256 can be circular, triangular, quadrangular, or an equivalent shape. However, the shape of the holes is not limited. The sealing tape can include any number of holes 252, 254, and 256 as long as the sealing tape 250 can prevent the electrode assembly 200 from being unwound. The number of holes 252, 254, and 256 is not limited.

The holes 252, 254, and 256 are formed in the sealing tape 250 to expose the separator 230 (which has a better affinity for the electrolyte than the sealing tape 250) to the outer circumference of the electrode assembly 200. Furthermore, the holes 252, 254, and 256 form spaces between the side surface 310 of the case and the outer circumference of the electrode assembly 200 to which the sealing tape 250 is attached. Therefore, when the injected electrolyte flows along the outer circumference of the electrode assembly 200, the separator 230 (which is exposed to the outer circumference of the electrode assembly 200 through the holes 252, 254, and 256) helps electrolyte impregnation and allows the electrolyte to penetrate the battery via the spaces formed by the holes 252, 254, and 256.

When the holes 252, 254, and 256 are too large or too many holes 252, 254, and 256 are provided, the sealing tape 250 does not support the outer circumference of the electrode assembly 200 and the electrode assembly 200 can be deformed or damaged. Therefore, the size and number of holes 252, 254, 256 are such that the sealing tape 250 can support the outer circumference of the electrode assembly 200.

In order to improve electrolyte impregnation, as described above, the sealing tape can be modified, or the surface of the sealing tape can be formed of polyethylene (PE) coated with a material having an affinity for the electrolyte.

As described above, PVdF can be used as the material having an affinity for the electrolyte. The PVdF is wetted by the electrolyte and the electrolyte is diffused into the PVdF at a contact angle at the interface with the electrolyte ranging from about 1 to about 80° as measured during contact angle experimentation. In particular, the sealing tape may be formed of PVdF 761, PVdF 2801, or a mixture thereof. Alternatively, a compound including an ester group or a carboxyl group can be used as the material coated on the sealing tape instead of the PVdF.

In another embodiment, the surface of the sealing tape can be coated with a surfactant into which the electrolyte is diffused at a contact angle at the interface with the electrolyte ranging from about 1 to about 80° as measured during contact angle experimentation.

Surfactants have both hydrophilic groups and lipophilic groups and function to decrease the surface tension of water. Surfactants also penetrate, diffuse, emulsify, and bubble. As a representative function, surfactants are used to clean laundry and operate by mixing oil attached to the laundry fibers with water to remove dirt from the laundry. Surfactants are divided into anionic surfactants, cationic surfactants, nonionic surfactants, and ampholytic surfactants. Anionic surfactants are mainly used as synthetic detergents.

When the surfactant is dissolved in water, the lipophilic group ion dissociates. When the lipophilic group dissociates to form a negative charge (−), an anionic surfactant is formed. When the lipophilic group ion dissociates to form a positive charge (+), a cationic surfactant is formed. When the lipophilic group dissociates to form a positive charge (+) and a negative charge (−), an ampholytic surfactant is formed. When the lipophilic group does not ion dissociate, a nonionic surfactant is formed.

In one embodiment of the present invention, BRIJ® (i.e., a nonionic surfactant) is used as the surfactant. BRIJ® has an —OH group. BRIJ® has relatively low hydrophilic properties but has ester and ether bonds, giving BRIJ® excellent lipophilic properties. BRIJ® is only one nonlimiting example of a surfactant that can be used, and it is understood the surfactant is not limited to BRIJ®.

When the surfactant contacts the non-aqueous electrolyte, the surfactant's lipophilic group attaches to the surfaces of the non-aqueous electrolyte molecules. Therefore, the interface between the surfactant and the non-aqueous electrolyte increases and the surface tension of the electrolyte decreases. As a result, the sealing tape is easily wetted by the electrolyte and the electrolyte is easily diffused into the sealing tape.

As described above, when the surface of the sealing tape is coated with a polymer material having an affinity for the electrolyte or with a surfactant, it is possible to increase the penetration speed and the impregnation speed of the electrolyte. This is because the surface of the insulating plates are not exclusive in contact with the electrolyte.

Figure 5:
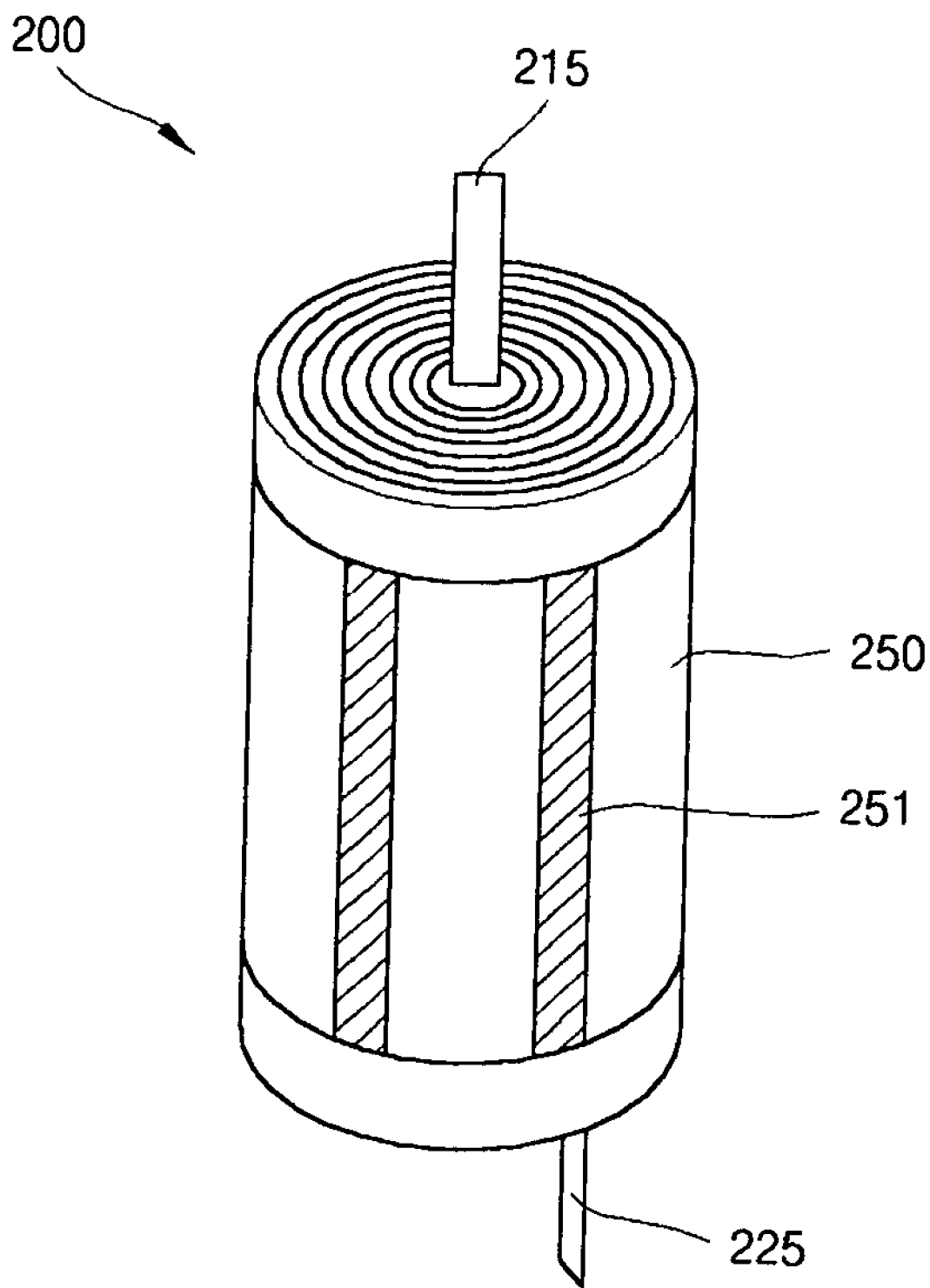
FIG. 5 is a perspective view of an electrode assembly including a sealing tape according to still yet another embodiment of the present invention.

According to one embodiment, the entire surface of the sealing tape can be coated. Alternatively, only a portion of the surface of the sealing tape can be coated. FIG. 5 is a perspective view of one embodiment of an electrode assembly 250 in which only a portion of the sealing tape is coated. As shown, the sealing tape 250 includes coating layers 251 on only a portion of the surface of the sealing tape 250. The coating layers 251 are coated in the lengthwise direction of the electrode assembly 200. The distance between the coating layers 251 and the width of the coating layers 251 can be controlled according to the viscosity of the electrolyte and the structure of the battery. For example, when the viscosity of the electrolyte is high, the distance between the coating layers 251 is smaller and the width of the coating layers 251 is larger.

As described above, when the sealing tape is coated at intervals with components having an affinity for the electrolyte, a capillary phenomenon occurs during electrolyte impregnation, and the electrolyte easily flows where the coating layers 251 are formed, and where the side surface 310 of the case contacts the sealing tape 250. The portions of the sealing tape where the coating layers 251 are not formed and where the side surface 310 of the case contacts the sealing tape 250 can function as paths through which bubbles are discharged.

It is possible to modify the surface even when the coating layers are within 1 μm and when the surface is coated with a monolayer.

In another embodiment, a plurality of holes can be formed in the coating layers of the sealing tape. The holes can be circular, triangular, quadrangular, or an equivalent. However, the shape of the holes is not limited. The function and operation of the holes are described above.

Figure 6A:
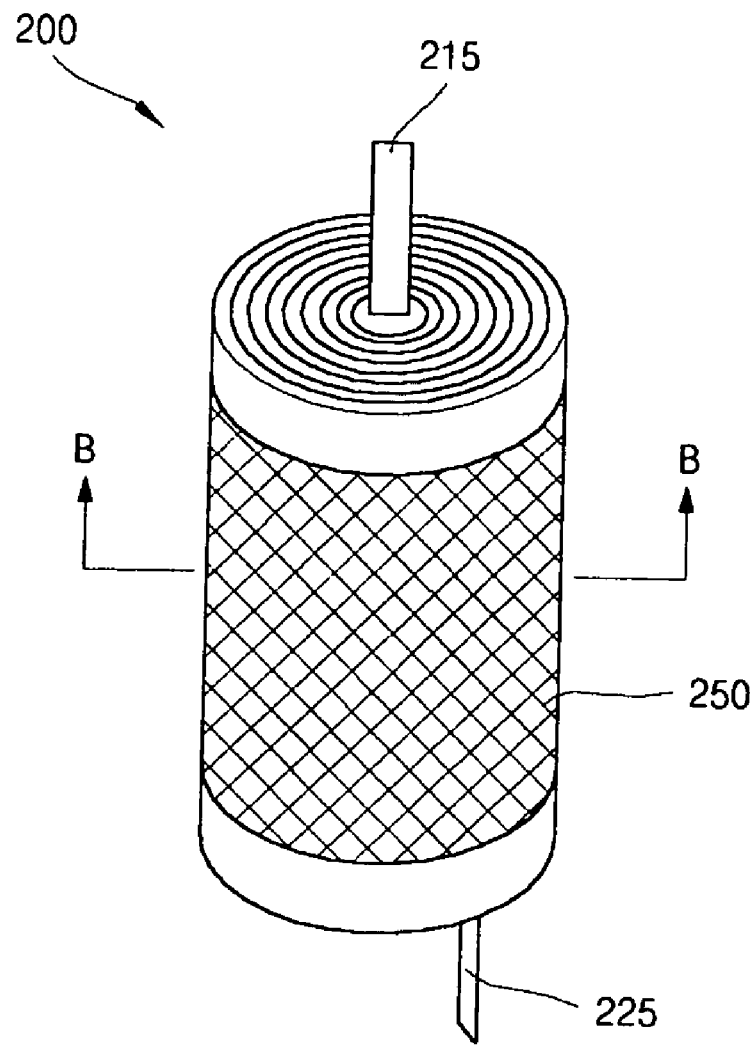
FIG. 6a is a perspective view of an electrode assembly including a sealing tape according to yet another embodiment of the present invention.
Figure 6B:
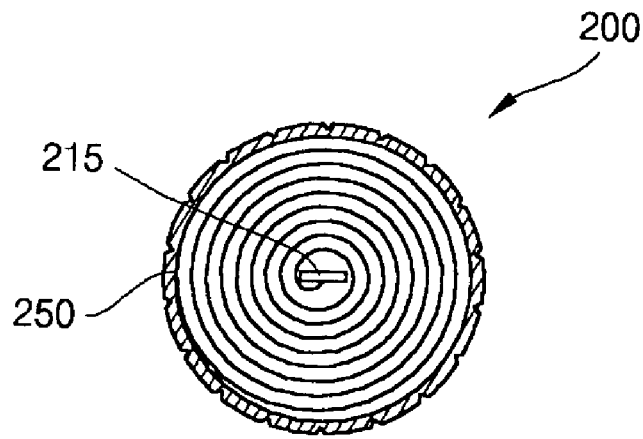
FIG. 6b is a cross-sectional view of the electrode assembly of FIG. 6a taken along line B-B.

FIG. 6a is a perspective view of an electrode assembly including a sealing tape according to another embodiment of the present invention. FIG. 6b is a cross-sectional view of the electrode assembly of FIG. 6a taken along the line B-B.

Referring to FIG. 6a, shallow intersecting oblique lines are formed on the surface of the sealing tape 250. This provides roughness on the surface of the sealing tape 250. In FIG. 6a, the shallow intersecting oblique lines represent one exemplary means of imparting roughness to the surface of the sealing tape. Various patterns or protrusions may formed to make the surface of the sealing tape 250 rough.

When oblique lines are formed on the surface of the sealing tape 250 to make the surface of the sealing tape 250 rough, the area of the sealing tape 250 that contacts the electrolyte increases. As described above, the sealing tape 250 can be wetted by the electrolyte and the electrolyte can be diffused into the sealing tape 250 at a contact angle at the interface with the electrolyte ranging from about 1 to about 80° as measured during contact angle experimentation. This contact angle can be accomplished by increasing the roughness of the surface of the sealing tape 250. Referring to FIG. 6b, the space between the side surface 310 of the case and the sealing tape 250 (through which the electrolyte flows) is increased, thereby improving electrolyte impregnation. The degree of roughness can be controlled according to the viscosity of the electrolyte and the structure of the battery. For example, when the viscosity of the electrolyte is high, the degree of the roughness should be greater.

Figure 7A:
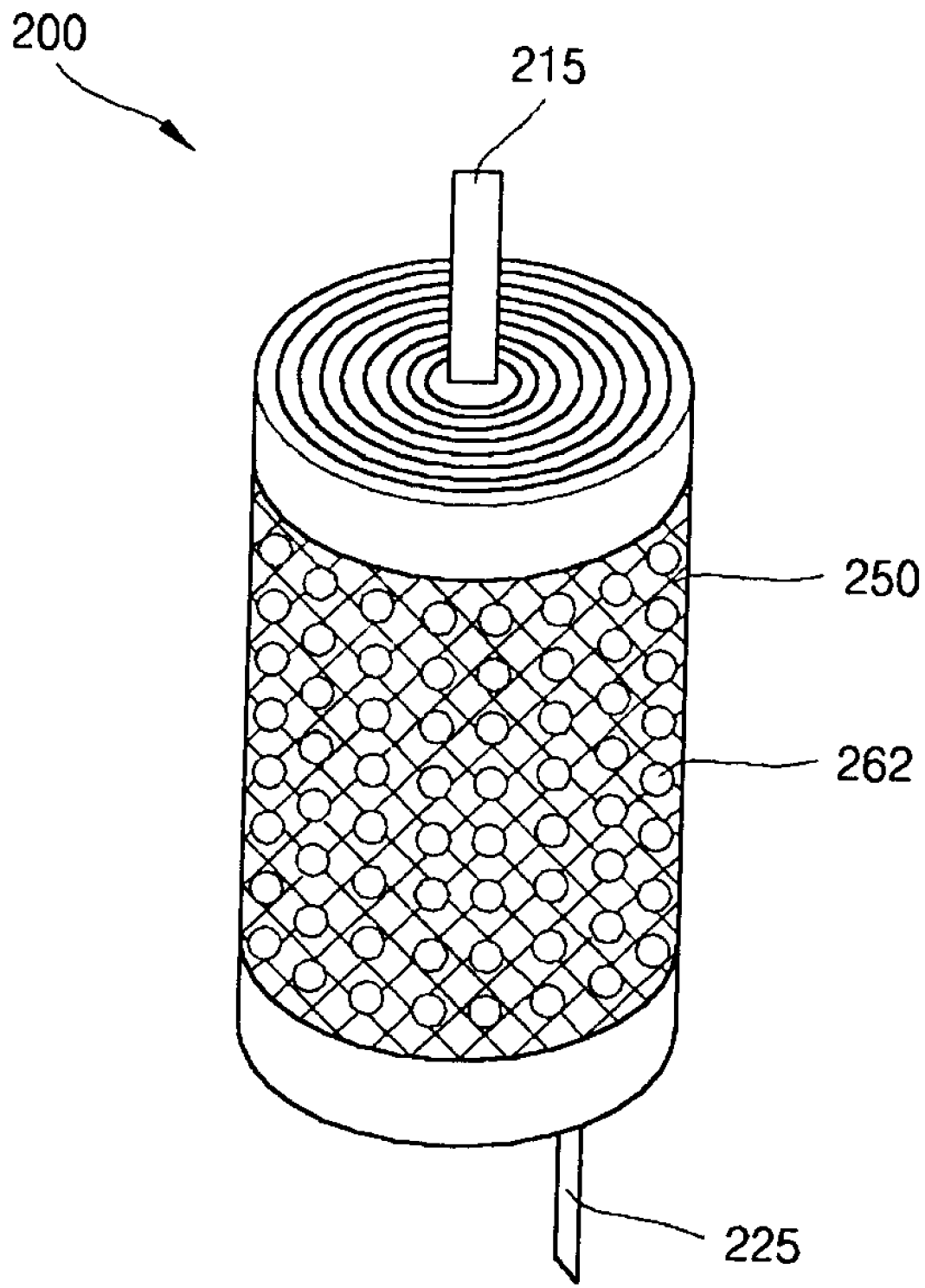
FIG. 7a is a perspective view of an electrode assembly including a sealing tape according to another embodiment of the present invention.
Figure 7B:
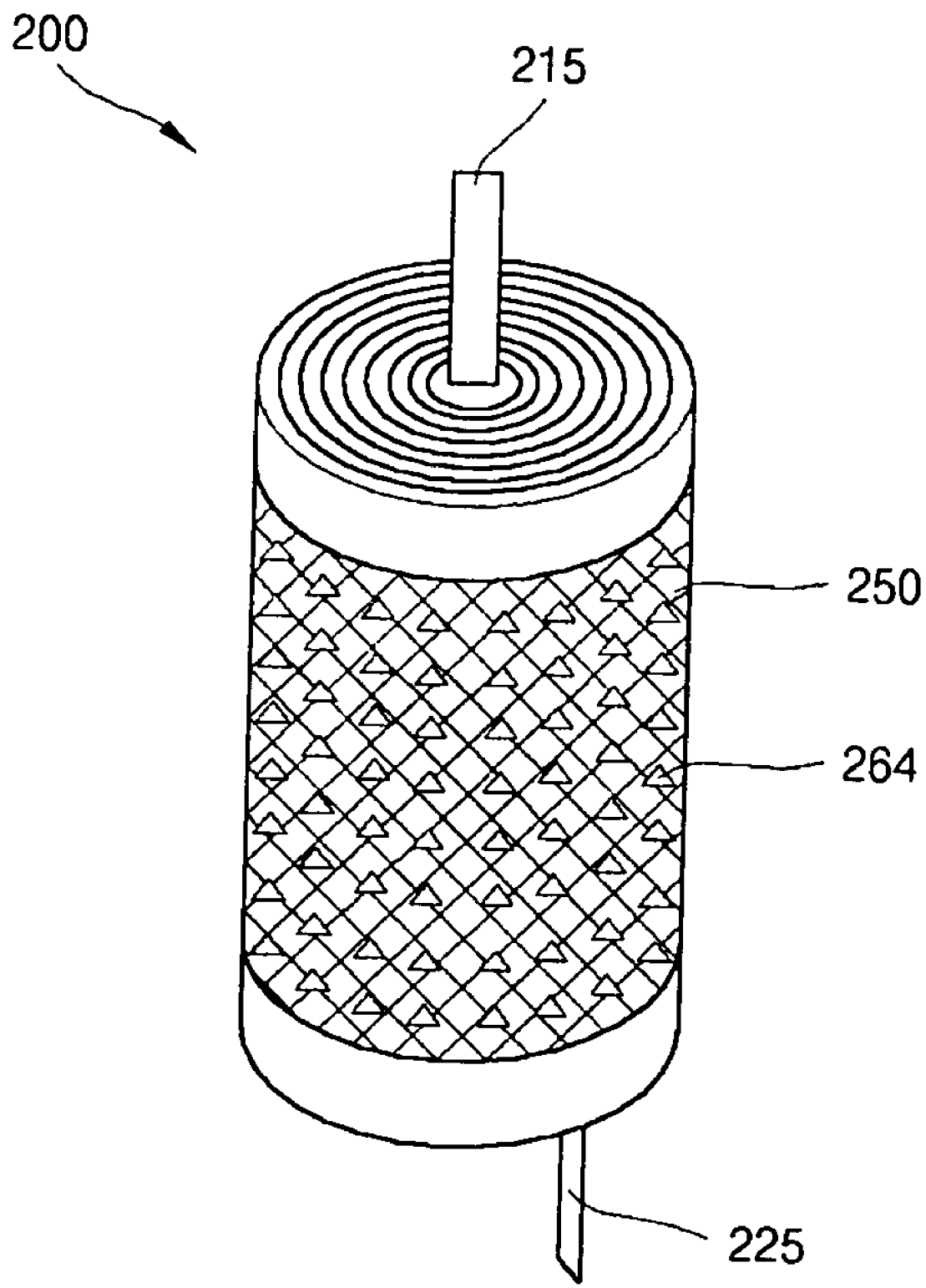
FIG. 7b is a perspective view of an electrode assembly including a sealing tape according to yet another embodiment of the present invention.
Figure 7C:
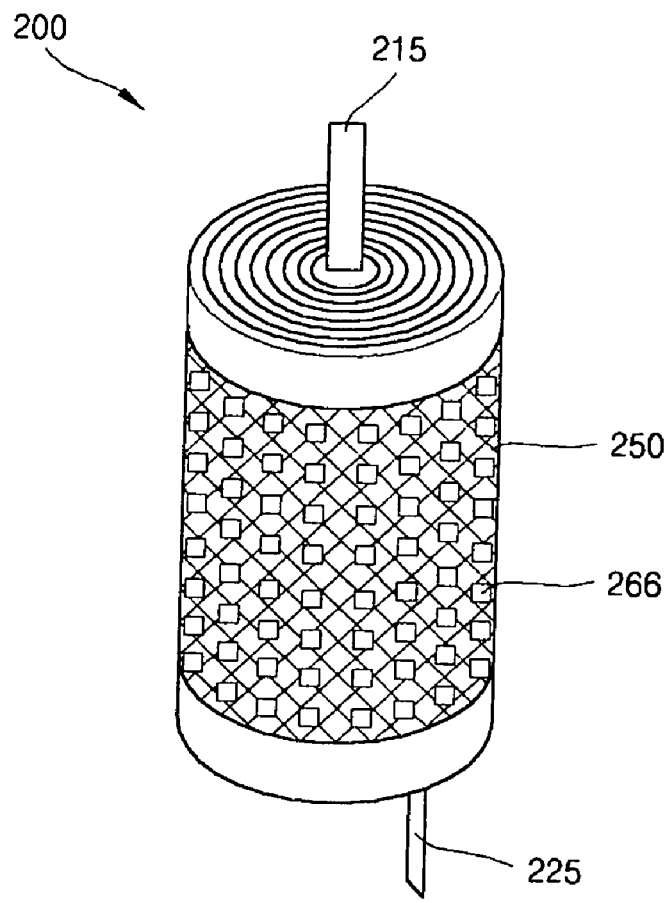
FIG. 7c is a perspective view of an electrode assembly including a sealing tape according to still another embodiment of the present invention.

Referring to FIGS. 7a, 7b, and 7c, in addition to forming a rough surface, holes 262, 264, and 266 can be formed in the sealing tape 250. The holes 262, 264, and 266 can be circular, triangular, quadrangular, or an equivalent. However, the shape of the holes 262, 264, and 266 is not limited. The function and operation of the holes 262, 264, and 266 are described above.

Referring back to FIG. 2, the cylindrical case 300 includes a cylindrical side surface 310 having a diameter sufficient to accommodate the cylindrical electrode assembly 200. The case 300 further include a bottom surface 320 for sealing the bottom of the cylindrical side surface 310. The top of the cylindrical side surface 310 can be open for insertion of the electrode assembly 200. The negative electrode tab 225 of the electrode assembly 200 can be connected to the bottom surface 320 of the cylindrical case 300 so that the cylindrical case 300 can function as the negative electrode. Also, the cylindrical case 300 can be formed of aluminum (Al), steel (Fe), or an alloy of these metals. Furthermore, the cylindrical case 300 can include a first crimp 330 at its upper end, wherein the case 300 is crimped toward the inside of the case to secure the top of the cap assembly 400. Also, the cylindrical case 300 can include a second crimp 340, wherein the case 300 is crimped toward the inside of the case 300 to secure the bottom of the cap assembly 400. The second crimp 340 is formed in a portion of the case 300 beneath the first crimp 330 and is separated from the first crimp 330 by a distance corresponding to the thickness of the cap assembly 400.

Referring again to FIG. 2, the cap assembly 400 can include a safety vent 410, a current intercepting unit 420, a secondary protecting device 480, and a cap up 490. A protrusion that protrudes downward can be formed in the center of the plate-shaped safety vent 410. Therefore, the protrusion is positioned in the lower part of the cap assembly 400 and is pushed upward by pressure generated in the secondary battery. The positive electrode tab 215 is withdrawn from the positive electrode plate 210 and welded to the bottom of the safety vent 410 so that the safety vent 410 and the positive electrode plate 210 of the electrode assembly 200 are electrically connected to each other. The negative electrode tab can directly contact the case 300 to electrically connect it to the case 300.

Figure 8A:
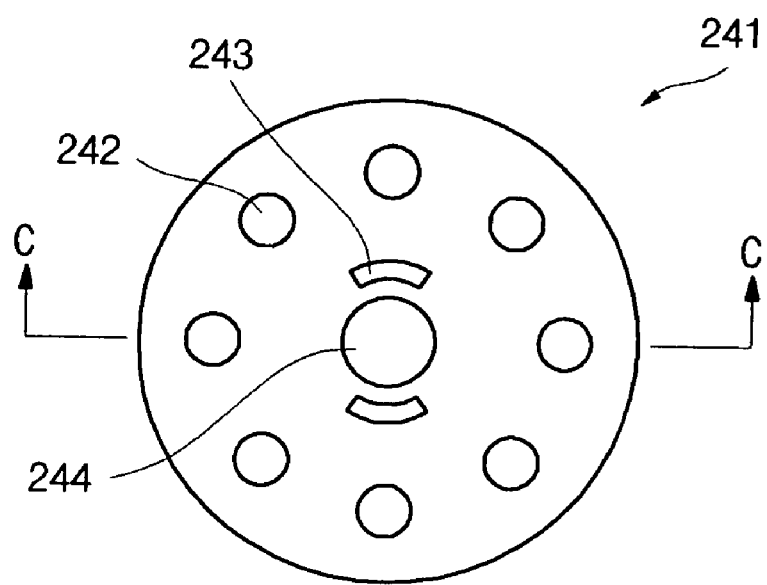
FIG. 8a is a plan view of a second insulating plate according to one embodiment of the present invention.
Figure 8B:
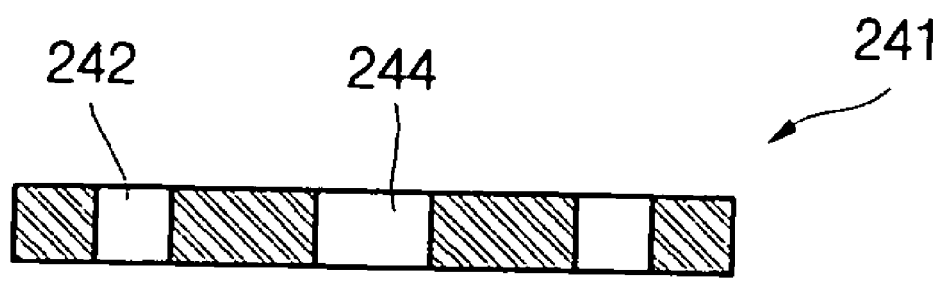
FIG. 8b is a cross-sectional view of the second insulating plate of FIG. 8a taken along line C-C.

Referring to FIGS. 2, 8a and 8b, the second insulating plate 241 can be positioned between the cap assembly 400 (in particular, the safety vent 410) and the upper part of the electrode assembly 200. The second insulating plate 241 prevents the cap assembly 400 (including the safety vent 410 electrically connected to the positive electrode tab 215) and the electrode assembly 200 from short-circuiting. Referring to FIGS. 8a and 8b, the second insulating plate can include electrolyte holes 242, positive electrode tab holes 243, and a hollow 244. Electrolyte holes 242 are paths through which the injected electrolyte is impregnated. Positive electrode tab holes 243 are paths through which the positive electrode tab 215 is ejected. Hollow 244 is connected to one end of a center pin.

Figure 9A:
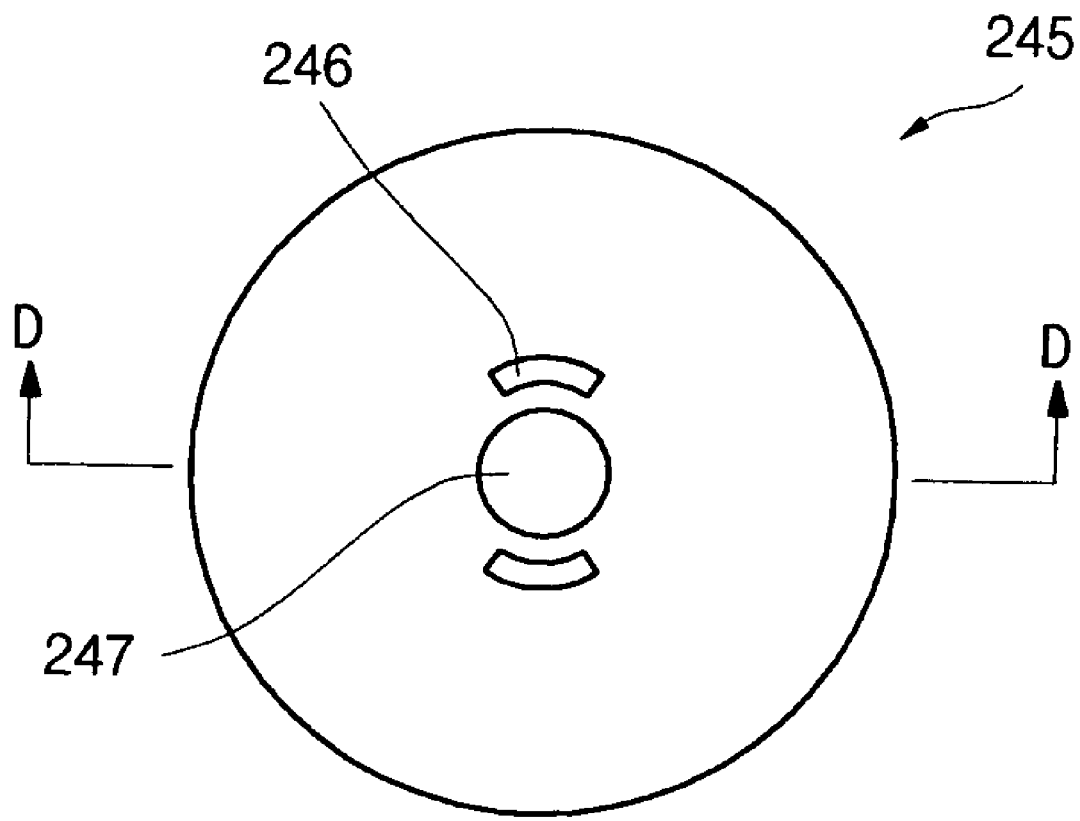
FIG. 9a is a plan view of a first insulating plate according to one embodiment of the present invention.
Figure 9B:
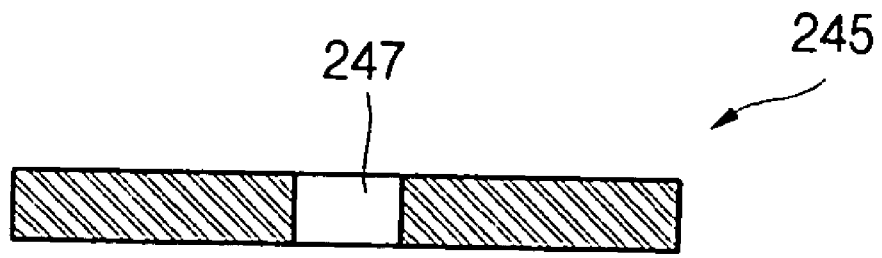
FIG. 9b is a cross-sectional view of the first insulating plate of FIG. 9a taken along line D-D.

Referring to FIGS. 2, 9a and 9b, the first insulating plate 245 can be positioned between the bottom surface 320 of the case and the lower part of the electrode assembly 200. The first insulating plate 245 prevents the case 300 (including the bottom surface 320 electrically connected to the negative electrode tab 225) and the electrode assembly 200 from short-circuiting. Referring to FIGS. 9a and 9b, the first insulating plate can include a negative electrode tab hole 246 and a hollow 247. The negative electrode tab hole 246 is a path through which the negative electrode tab 225 is ejected. The hollow 247 is connected to one end of the center pin. When the negative electrode tab 225 is formed on the outermost circumference of the electrode assembly 200, the negative electrode tab hole 246 need not be formed. In this case, after the first insulating plate 245 is positioned under the electrode assembly 200 and the negative electrode tab 225 is bent at approximately a right angle, the negative electrode tab 225 is welded to the bottom surface 320 of the case 300.

The second insulating plate 241 and the first insulating plate 245 are commonly formed of a polyolefin based resin such as polyethylene (PE), polypropylene (PP), and polyimide (PI). Since polyethylene (PE) has low density and a loose arrangement of molecules, polyethylene (PE) is well extended, has low tensile strength and high shock resistance. Therefore, polyethylene (PE) can be easily processed and used. Also, since polyethylene (PE) is formed of only $CH_2$, its electrical insulation properties are excellent. Since polyethylene (PE) has a symmetrical carbon (C) chain, as illustrated in its chemical formula, polyethylene (PE) is suitable for use as a high frequency insulating material.

Polypropylene (PP) is generated together with ethylene when naphthalene is decomposed, and has an isotactic structure. A methyl group is arranged in the same direction, as illustrated in the chemical formula of PP. Crystallinity is high before molding but is reduced after molding. The electric characteristics of polypropylene (PP) and polyimide (PI) are similar to the electric characteristics of polyethylene (PE).

However, polyethylene (PE) and polypropylene (PP) do not have an affinity for the non-aqueous electrolyte as described above. This is because large differences in surface energy exist between polyethylene (PE) and polypropylene (PP) and the non-aqueous electrolyte so that polyethylene (PE) and polypropylene (PP) are not easily coupled to the electrolyte molecules. Therefore, when the sealing tape is formed of polyethylene (PE) or polypropylene (PP) and the tape contacts the electrolyte, the electrolyte beads up so that the sealing tape is barely wetted by the electrolyte and so that the electrolyte is barely diffused into the sealing tape.

According to one embodiment of the present invention, the first and second insulating plates can be formed of a material having an affinity for the electrolyte instead of the conventional material that does not have an affinity for the electrolyte. This makes it possible to improve electrolyte impregnation. The material having an affinity for the electrolyte may include a polymer material that is wetted by the electrolyte and into which the electrolyte is diffused at a contact angle at the interface with the electrolyte ranging from about 1 to about 80° as measured during contact angle experimentation. For example, PVdF can be used as the material having an affinity for the electrolyte. PVdF has a repeating —$CH_2$— $CF_2$— structure and is a kind of fluoro-resin used to bind electrode active materials to current collectors. The main chain of the fluoro-resin has the same C—C bond as polyolefin. The fluoro-resin is a synthetic resin having a structure in which a part or all of the hydrogen atoms of the polyolefin are replaced by fluorine atoms (F).

As a result of experimentation of the impregnation of the electrolyte, the PVdF that is easily wetted by the non-aqueous electrolyte and into which the non-aqueous electrolyte that is easily diffused can be PVdF 761 or PVdF 2801. Therefore, the insulating plates may comprise PVdF 761, PVdF 2801, or a mixture thereof.

As described above, in order to make the PVdF easily wetted by the non-aqueous electrolyte and to make the non-aqueous electrolyte easily diffused into the PVdF, the insulating plate can be modified by the PVdF. Alternatively, the insulating plate can be formed of a polymer material including an ester group or a carboxyl group (i.e., a hydrophilic atom group) instead of PVdF.

The ester group is an atom group that forms an aliphatic compound represented by RCOOR'. The ester is generated reaction of an alcohol or phenol with an organic or inorganic acid to remove water ($H_2O$), thereby forming the ester. In particular, inorganic acid esters, such as sulfuric acid ester and nitric ester, may be used as an organic solvent. The carboxyl group is an atom group that forms an aliphatic compound represented by RCOOH, such as acetic acid ($CH_3COOH$) and benzoic acid ($C_6H_5COOH$).

Polymer materials including an ester group or carboxyl group have an affinity for the non-aqueous electrolyte. When the insulating tape is formed of sulfuric acid ester or benzoic acid (including an ester group or carboxyl group), the insulating plate is easily wetted by the electrolyte and the electrolyte is easily diffused into the insulating plate. As a result, electrolyte impregnation is improved.

However, the insulating plates must not swell. Swelling is a characteristic of polymers having crystalline parts and amorphous parts penetrated by solvent molecules such that the volume of the polymer increases. Such a phenomenon can occur in the crystalline part of the polymer after a long time. However, since the distance between polymer chains is closer in the crystalline parts compared to the amorphous parts, there is a lesser chance that the phenomenon will occur in the crystalline part compared to the amorphous part.

When the polymer material including the ester group or carboxyl group absorbs the non-aqueous electrolyte causing the polymer material to swell, the insulating plates swell, thereby deforming the electrode assembly. Therefore, when the material having an affinity for the electrolyte is used for the material of the insulating plates, a countermeasure should be provided to prevent swelling. Alternatively, a material that does not swell should be used.

According to another embodiment of the present invention, a lithium ion secondary battery includes an electrode assembly, a case for accommodating the electrode assembly, a cap assembly for sealing the case, a first insulating plate positioned between the electrode assembly and the case, and a second insulating plate positioned between the electrode assembly and the cap assembly. The insulating plates can be formed of a mixture of a material having an affinity for the electrolyte and a material that does not have an affinity or has a reduced affinity for the electrolyte.

A polyolefin based resin such as polyethylene (PE), polypropylene (PP), and polyimide (PI) can be used as the material that does not have an affinity for the electrolyte as described above. The material that does not have an affinity for the electrolyte and the material having an affinity for the electrolyte are mixed to improve electrolyte impregnation. Oxides in which the electrolyte is diffused at a contact angle ranging from about 1 to about 80° as measured during contact angle experimentation can be used as the material having an affinity for the electrolyte. Nonlimiting examples of suitable oxides include silica ($SiO_2$), aluminum oxide ($Al_2O_3$), and equivalents.

The silica (silicon dioxide) is a transparent solid and has a molecular weight of about 60.09. Since natural silica includes impurities, natural silica can be opaque or colored. $SiO_4$ is a regular tetrahedron in which silicon is surrounded by four oxygen atoms, and is used as a basic unit. All of the oxygen atoms are shared by the silicon so that a large, three dimensionally connected molecular structure is provided. Quartz glass having an irregular molecular arrangement is obtained by melting and then cooling crystalline silicon dioxide. The silica is not melted by acid, however, and becomes a soluble silicate by alkali melting or carbonate melting, and is slowly melted by a strong alkali aqueous solution. An amorphous silica gel absorbs moisture to be used as a desiccant.

Aluminum oxide (alumina) has various shapes. $\alpha$-aluminum oxide, generated by heating aluminum hydroxide at a temperature of less than about 300° C., is pure and stable. $\gamma$-aluminum oxide has poor crystallinity and is generated by dehydrating $\beta$-alumina hydrate slightly including alkali. Among the above, the aluminum oxide having poor crystallinity, such as $\gamma$-aluminum oxide, functions as a strong dehydrating catalyst. Aluminum oxides or alumina hydrates that are not crystallized are commonly referred to as alumina gels and are used as antacids and absorbents.

Silica and aluminum oxide each have an affinity for the non-aqueous electrolyte. When the silica and the aluminum oxide are mixed with the polymer material that does not have an affinity for the electrolyte, the silica and the aluminum oxide function as fillers. The oxide can be present in an amount ranging from about 30% to about 95% by weight based on the total weight of the mixture. Here, as the amount of the filler increases, the affinity for the electrolyte increases.

As described above, the insulating plates may be modified by the polymer material having an affinity for the electrolyte. Alternatively, the insulating plates may be include the filler (such as the oxide) mixed with polyethylene (PE) or polypropylene (PP). Since the insulating plates do not exclusively contact the electrolyte, it is possible to increase the penetration speed and impregnation speed of the electrolyte.

Figure 10A:
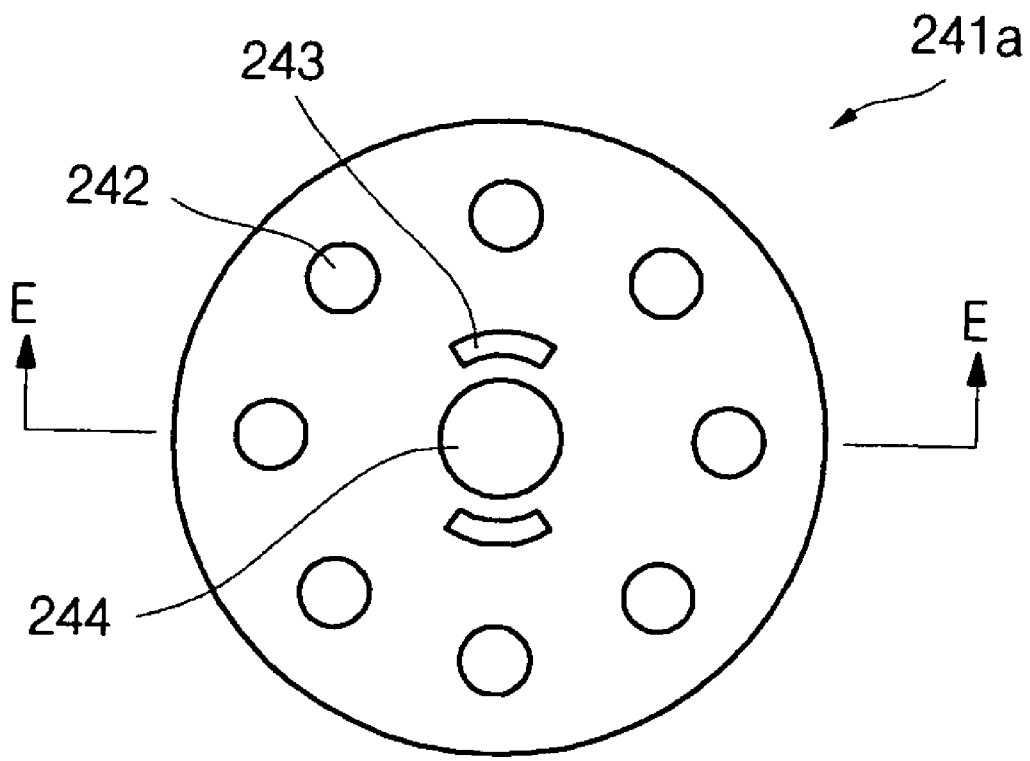
FIG. 10a is a plan view of a second insulating plate according to another embodiment of the present invention.
Figure 10B:
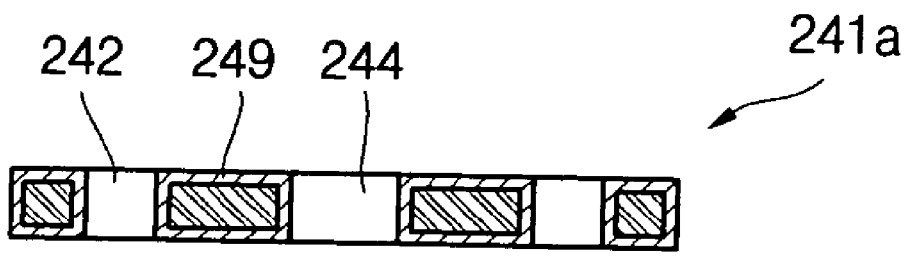
FIG. 10b is a cross-sectional view of the second insulating plate of FIG. 10a taken along line E-E.

According to another embodiment of the present invention, referring to FIGS. 2 and 10a, the second insulating plate 241a can be positioned between the cap assembly 400 (in particular, the safety vent 410) and the upper part of the electrode assembly 200. The second insulating plate 241a prevents the cap assembly 400 (including the safety vent 410 electrically connected to the positive electrode tab 215) and the electrode assembly 200 from short-circuiting. Referring to FIG. 10a, the second insulating plate may include electrolyte holes 242 through which the injected electrolyte is impregnated, positive electrode tab holes 243 through which the positive electrode tab 215 is ejected, and a hollow 244 connected to one end of a center pin. Referring to FIG. 10b, the second insulating plate 241a can be coated with the coating composition on only a portion of the insulating plate. As shown, the coating composition is coated in layers 249 on the second insulating plate.

Figure 11A:
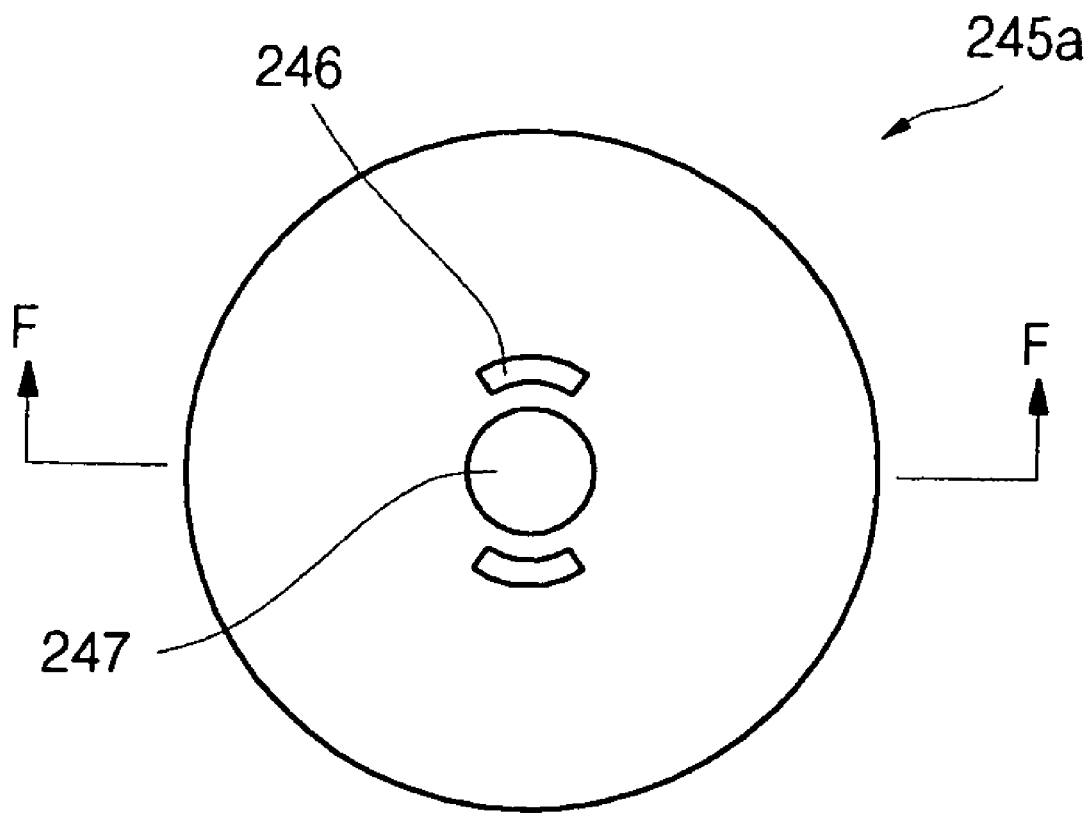
FIG. 11a is a plan view of a first insulating plate according to another embodiment of the present invention.
Figure 11B:
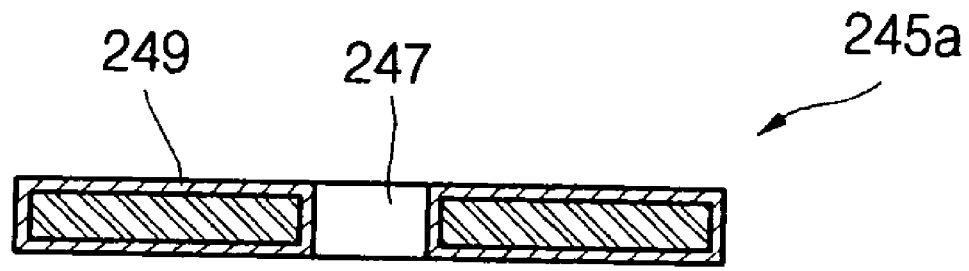
FIG. 11b is a cross-sectional view of the first insulating plate of FIG. 11a taken along line F-F.

According to another embodiment of the present invention, referring to FIGS. 2 and 11a, the first insulating plate 245a can be positioned between the bottom surface 320 of the case 300 and the lower part of the electrode assembly 200. The first insulating plate 245a prevents the case 300 (including the bottom surface 320 electrically connected to the negative electrode tab 225) and the electrode assembly 200 from short-circuiting. Referring to FIG. 11a, the first insulating plate 245a may include a negative electrode tab hole 246 through which the negative electrode tab 225 is ejected, and a hollow 247 connected to one end of the center pin. Referring to FIG. 11b, the first insulating plate 245a can be coated with the coating composition on only a portion of the insulating plate. As shown, the coating composition is coated in layers 249 on the first insulating plate.

When the negative electrode tab 225 is formed on the outermost circumference of the electrode assembly 200, the negative electrode tab hole 246 need not be formed. Here, after the first insulating plate 245a is positioned under the electrode assembly 200 and the negative electrode tab 225 is bent at approximately a right angle, the negative electrode tab 225 is welded to the bottom surface 320 of the case 300.

The second insulating plate 241a and the first insulating plate 245a can be formed of a polyolefin based resin such as polyethylene (PE), polypropylene (PP), or polyimide (PI), as described above. The characteristics of polyethylene (PE), polypropylene (PP), and polyimide (PI) are described above.

As described above, polyethylene (PE) and polypropylene (PP) do not have an affinity for the non-aqueous electrolyte. The reason why polyethylene (PE) and polypropylene (PP) do not have an affinity for the non-aqueous electrolyte is described above.

According to another embodiment of the present invention, the insulating plates (which do not have an affinity for the electrolyte) are coated with a material having an affinity for the electrolyte in order to improve electrolyte impregnation. The material having an affinity for the electrolyte may comprise a polymer material that is wetted by the electrolyte and into which the electrolyte is diffused at a contact angle ranging from about 1 to about 80° as measured during contact angle experimentation. For example, PVdF can be used as the material having an affinity for the electrolyte. The PVdF has a repeating —$CH_2$—$CF_2$— structure and is a kind of fluoro-resin used to bind electrode active materials to current collectors. The main chain of the fluoro-resin has the same C—C bond as polyolefin. The fluoro-resin is a synthetic resin having a structure in which a part or all of the hydrogen atoms of the polyolefin are replaced by fluorine atoms (F).

As a result of experimentation of electrolyte impregnation, it was found that PVdF that is easily wetted by the non-aqueous electrolyte and into which the non-aqueous electrolyte that is easily diffused can be PVdF 761 or PVdF 2801. Therefore, the insulating plate can be coated with PVdF 761, PVdF 2801, or a mixture thereof.

As described above, the insulating plates can be modified by the PVdF. Alternatively, the insulating plate can be formed of a polymer material including an ester group or carboxyl group (i.e., a hydrophilic atom group) instead of the PVdF.

The ester group is an atom group that forms an aliphatic compound represented by RCOOR'. The ester is generated reaction of an alcohol or phenol with an organic or inorganic acid to remove water ($H_2O$), thereby forming the ester. In particular, inorganic acid esters, such as sulfuric acid ester and nitric ester, may be used as an organic solvent. The carboxyl group is an atom group that forms an aliphatic compound represented by RCOOH, such as acetic acid ($CH_3COOH$) and benzoic acid ($C_6H_5COOH$).

Polymer materials including an ester group or carboxyl group have an affinity for the non-aqueous electrolyte. When the insulating tape is formed of sulfuric acid ester or benzoic acid (including an ester group or carboxyl group), the insulating plate is easily wetted by the electrolyte and the electrolyte is easily diffused into the insulating plate. As a result, electrolyte impregnation is improved.

However, the insulating plates must not swell. Swelling is a characteristic of polymers having crystalline parts and amorphous parts penetrated by solvent molecules such that the volume of the polymer increases. Such a phenomenon can occur in the crystalline part of the polymer after a long time. However, since the distance between polymer chains is closer in the crystalline parts compared to the amorphous parts, there is a lesser chance that the phenomenon will occur in the crystalline part compared to the amorphous part.

When the polymer material including the ester group or carboxyl group absorbs the non-aqueous electrolyte, the polymer material swells due to overcharge. This causes the insulating plates to swell, thereby deforming the electrode assembly. Therefore, when the surfaces of the insulating plates are coated with a material having an affinity for the electrolyte, the coating layer should be thin so that the material does not swell.

In another embodiment, the insulating plates can be coated with a surfactant.

Surfactants have both hydrophilic groups and lipophilic groups and function to decrease the surface tension of water. Surfactants also penetrate, diffuse, emulsify, and bubble. As a representative function, surfactants are used to clean laundry and operate by mixing oil attached to the laundry fibers with water to remove dirt from the laundry. Surfactants are divided into anionic surfactants, cationic surfactants, nonionic surfactants, and ampholytic surfactants. Anionic surfactants are mainly used as synthetic detergents.

When the surfactant is dissolved in water, the lipophilic group ion dissociates. When the lipophilic group dissociates to form a negative charge (−), an anionic surfactant is formed. When the lipophilic group ion dissociates to form a positive charge (+), a cationic surfactant is formed. When the lipophilic group dissociates to form a positive charge (+) and a negative charge (−), an ampholytic surfactant is formed. When the lipophilic group does not ion dissociate, a nonionic surfactant is formed.

In one embodiment of the present invention, BRIJ® (i.e., a nonionic surfactant) is used as the surfactant. BRIJ® has an —OH group. BRIJ® has relatively low hydrophilic properties but has ester and ether bonds, giving BRIJ® excellent lipophilic properties. BRIJ® is only one nonlimiting example of a surfactant that can be used, and it is understood that the surfactant is not limited to BRIJ®.

When the surfactant contacts the non-aqueous electrolyte, the surfactant's lipophilic group attaches to the surfaces of the non-aqueous electrolyte molecules. Therefore, the interface between the surfactant and the non-aqueous electrolyte increases and the surface tension of the electrolyte decreases. As a result, the insulating plate is easily wetted by the electrolyte and the electrolyte is easily diffused into the insulating plate.

As described above, the insulating plate can be coated with a polymer material having an affinity for the electrolyte. Alternatively, the insulating plate can be coated with a surfactant. Since the surface of the insulating plate does not exclusively contact the electrolyte, penetration speed and impregnation speed of the electrolyte can be improved. It is possible to modify the surface even when the coating layers are within 1 μm and when the coating layer is a monolayer.

In a lithium ion secondary battery according to one embodiment of the present invention, a material of the sealing tape attached to the outermost circumference of the electrode assembly comprises a material having an affinity for the electrolyte. In an alternative embodiment, the sealing tape is coated with a material having an affinity for the electrolyte. The entire surface of the sealing tape may be coated, or a portion of the sealing tape may be coated. For example, the surface of the sealing tape may include layers of the coating material. In another embodiment, the surface of the sealing tape is rough, thereby improve electrolyte impregnation and increasing electrolyte impregnation speed, which takes the longest time in the process. This improves productivity.

In a lithium ion secondary battery according to another embodiment, the insulating plates comprise a material having an affinity for the electrolyte. In an alternative embodiment, the insulating plates comprise a mixture of a filler material having an affinity for the electrolyte and polypropylene or polyethylene. The insulating plates do not exclusively contact the electrolyte, enabling the electrolyte to easily flow in the battery, thereby improving electrolyte impregnation. Electrolyte impregnation speed is also improved, thereby improving productivity.

In a lithium ion secondary battery according to yet another embodiment of the present invention, the surfaces of the insulating plates are coated with a polymer material having an affinity for the electrolyte. In an alternative embodiment, the insulating plates are coated with a surfactant that reduces the surface tension of the electrolyte. The insulating plates do not exclusively contact the electrolyte, enabling the electrolyte to easily flow in the battery. This improves electrolyte impregnation and electrolyte impregnation speed, thereby improving productivity.

Although certain exemplary embodiments of the present invention have been illustrated and described, it would be appreciated by those skilled in the art that changes or modifications to the described embodiments can be made without departing from the spirit and scope of the invention, as defined in the appended claims and their equivalents.

What is claimed is:

1. A lithium ion secondary battery comprising:
   an electrode assembly of a jelly-roll configuration comprising a positive electrode, a negative electrode, and a separator between the positive electrode and the negative electrode, the electrode assembly having an exterior separator portion extending around the circumference of the electrode assembly;
   a case for accommodating the electrode assembly and an electrolyte;
   a sealing tape attached to a circumference of the electrode assembly adjacent the exterior separator portion, the sealing tape comprising a material having an affinity for the electrolyte and the sealing tape further comprising a plurality of holes; and
   a cap assembly for sealing an opening in the case.

2. The lithium ion secondary battery as claimed in claim 1, wherein the sealing tape is wetted by the electrolyte and the electrolyte is diffused into the sealing tape at a contact angle at an interface with the electrolyte ranging from about 1 to about 80°.

3. The lithium ion secondary battery as claimed in claim 1, wherein the material having an affinity for the electrolyte comprises a polymer material.

4. The lithium ion secondary battery as claimed in claim 3, wherein the polymer material comprises polyvinylidene fluoride.

5. The lithium ion secondary battery as claimed in claim 4, wherein the polyvinylidene fluoride is selected from the group consisting of a polyvinylidene fluoride homopolymer having a melt viscosity of 23-29 kilopoise and a melting point of 165-172° C., a polyvinylidene fluoride copolymer having a melt viscosity of 23-27 kilopoise and a melting point 140-145° C., and mixtures thereof.

6. The lithium ion secondary battery as claimed in claim 1, wherein the plurality of holes take a shape selected from the group consisting of circles, triangles, and quadrangles.

7. A lithium ion secondary battery comprising:
   an electrode assembly of a jelly-roll configuration comprising a positive electrode, a negative electrode, and a separator between the positive electrode and the negative electrode, the electrode assembly having an exterior separator portion extending around the circumference of the electrode assembly;
   a case for accommodating the electrode assembly and an electrolyte;
   a sealing tape attached to a circumference of the electrode assembly adjacent the exterior separator portion, the sealing tape comprising a material having an affinity for the electrolyte wherein the material having an affinity for the electrolyte is a polymer material and the polymer material is selected from the group consisting of materials having an ester group and materials having a carboxyl group.

\* \* \* \* \*